United States Patent

[11] 3,630,407

| [72] | Inventor | John J. Mross |
| | | Chicago, Ill. |
| [21] | Appl. No. | 24,463 |
| [22] | Filed | Mar. 16, 1970 |
| [45] | Patented | Dec. 28, 1971 |
| [73] | Assignee | International Harvester Company |
| | | Chicago, Ill. |
| | | Original application Oct. 17, 1968, Ser. No. 768,262, now Patent No. 3,537,283. Divided and this application Mar. 16, 1970, Ser. No. 24,463 |

[54] LOCKING FILLER CAP
4 Claims, 6 Drawing Figs.

[52] U.S. Cl. .................................................... 220/29, 220/39, 215/9
[51] Int. Cl. .................................................... B65d 51/18
[50] Field of Search ........................................ 220/29, 39, 55; 215/9; 222/153, 189, 548; 70/165, 188

[56] References Cited
UNITED STATES PATENTS

| 3,097,756 | 7/1963 | Dorsey .......................... | 215/9 |
| 3,477,607 | 11/1969 | Fuzzell et al. ................. | 220/39 |

Primary Examiner—George T. Hall
Attorney—Floyd B. Harman

ABSTRACT: A three-piece locking cap with disconnecting drive, which cap is adaptable to two uses or functions and which includes a filler cap, a separable outer cap, and drive-establishing means such as a locking pin having padlock openings therein. The cap has a nonlocked closure function provided by the filler cap only, and an interrupter-type locking function when the outer cap and locking pin are applied to the filler cap. The pin is selectively moved into drive-establishing position of interengagement between the caps, or padlocked to the outer cap in a drive interrupter or disconnecting position.

Patented Dec. 28, 1971

Inventor:
John J. Kross

John W. Gaines
Atty.

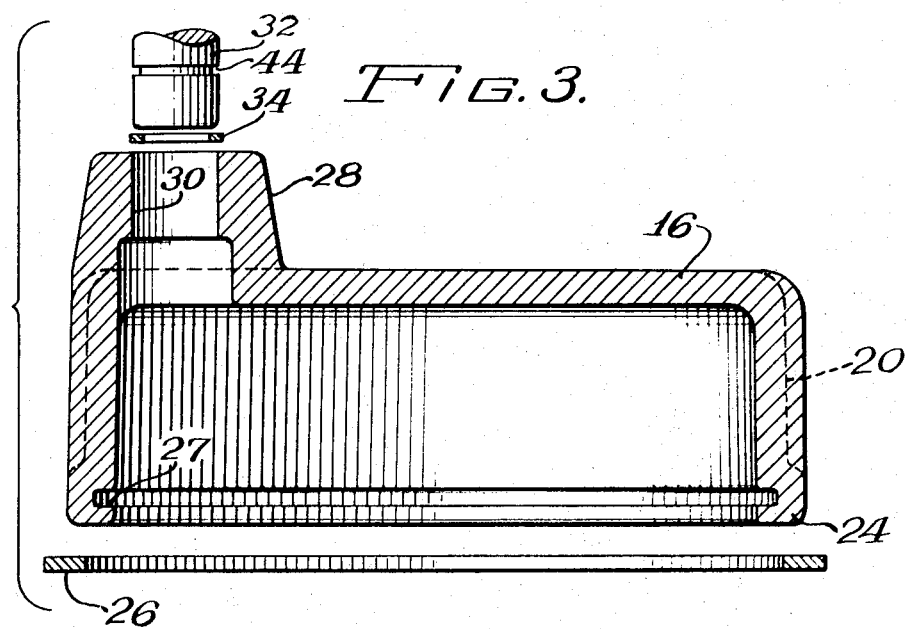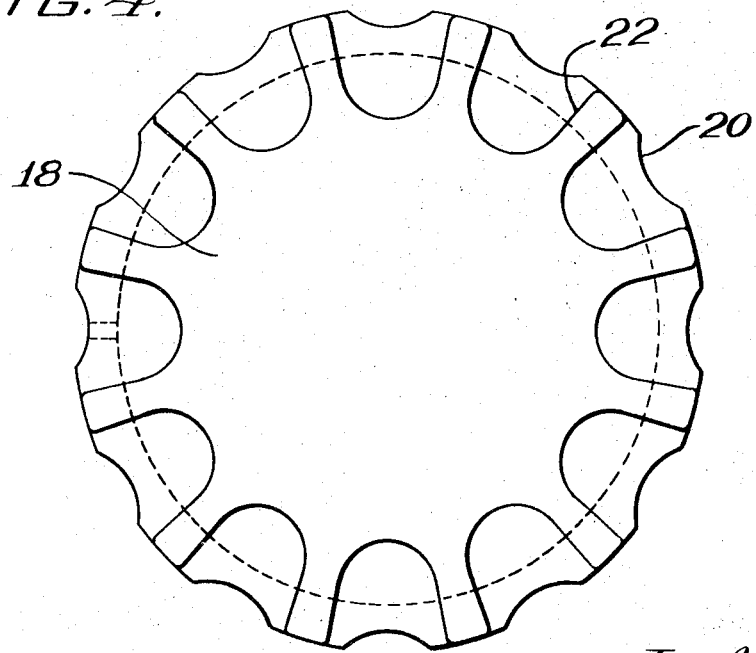
Inventor:
John J. Mross
John W. Haines
Atty.

Inventor:
John J. Kross
John W. Gaines
Atty.

LOCKING FILLER CAP

SPECIFICATION

The present application is a division of my copending application Ser. No. 768,262, filed Oct. 17, 1968, now U.S. Pat. No. 3,537,283.

This invention relates to a tank locking cap assembly with disconnecting drive and, more particularly, to an assembly of inner and outer caps threadably received on the filter pipe of a tank and effective to be unscrewed therefrom when a drive-establishing interposed pin interengages the caps. To prevent cap removal, the drive is disconnected by disengaging the pin from one of the two caps and padlocking the pin out of the interposed position so as to keep it disengaged.

Caps for the fuel tanks of vehicles, for example, are offered on one category as a simple filter cap affording no protection against unwarranted removal, and are offered in another category as a locking or so-called protector cap requiring unlocking for removal. The practice is to make the two categories of cap according to separate designs, and it is therefore the further practice to provide for no common parts and for no interchangeability thereamong.

The simple filler cap or inner cap is basic to the design according to my invention, with nothing sacrificed and yet with the filler cap design rendering it usable selectively as a simple cap or as the inner cap part of a protector cap assembly, as will not be explained in detail.

Features, objects, and advantages will either be specifically pointed out or become apparent when, for a better understanding of my invention, reference is made to the following description taken in conjunction with the accompanying drawings which show certain preferred embodiments thereof, and in which:

FIGS. 2 and 3 are respective top plan and exploded longitudinal elevational sectional views of the assembly, limited to showing only the external parts;

FIGS. 4 and 5 are top plan and longitudinal elevational sectional views of may invention utilized as a simple filler cap.

Figure 1:
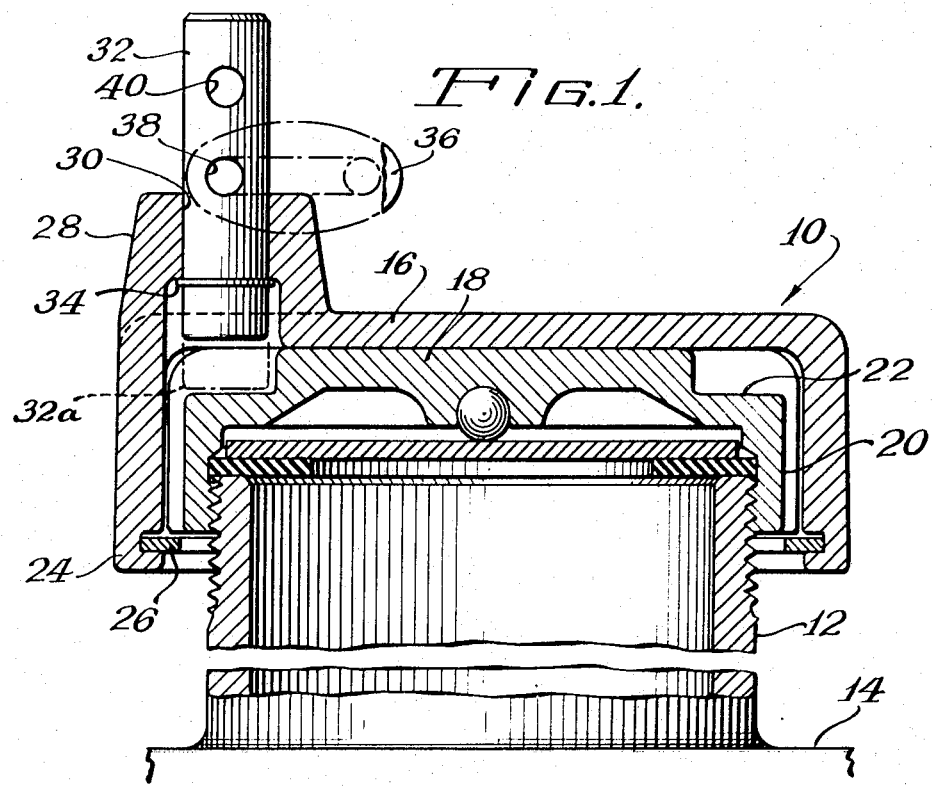
FIG. 1 is a longitudinal elevational view in cross section of my invention in its usage in a protector cap assembly on a tank.

More particularly, a cap assembly 10 is shown installed, in FIG. 1 of the drawings, in a position on the filler pipe neck 12 of a tank 14 which holds fuel for, and which is mounted on, a vehicle such as an off-the-road rubber-tired vehicle or track-type vehicle. The parts of the assembly include relatively rotatable outer and inner caps 16 and 18, the inner one 18 of which is a simple, screw-on filler cap.

The filler cap 18 has a lower series of external finger scallops 20 arranged in a cylindrical row thereabout and an upper series of external finger scallops 22 arranged in a radial ring in the plane of and about the top of the cap.

The open end 24 of the outer cap 16 is prolongated so as to extend slightly past the corresponding end of the filler cap 18 and is removably secured thereto by means of a snapring 26 carried in a circular groove 27 (FIG. 3) located inside of the mouth of the end 24 and slightly inwardly offset with respect thereto. A single hollow boss 28 integrally projects upwardly from the periphery of the outer cap 16 and is formed with a vertical opening 30 in which it slidably receives and guides a vertically disposed locking pin 32.

It will be appreciated that the guide boss 28 is vertically aligned with the outermost periphery of the filler cap 18 and, when it registers with and interengages the selected scallop 22, it will transmit maximum leverage into the screw-on filler cap 18, both for applying it to and for removing it from the filler neck 12.

When grasped at the upper end, the pin 32 is operatively moved between an advanced, drive-establishing broken-line position as shown by the broken lines 32a in FIG. 1 in which the upper end of the pin protrudes and the lower inner end of the pin interengages with the walls of a selected one of the upper scallops 22, and a locked upwardly displaced position as shown in solid lines in which the pin protrudes a materially greater extent upwardly above the boss 28. A snapring 34 encircling the lower internal end of the pin 32 prevents its unwanted removal from the outer cap 16 of the assembly and, in the locked upwardly displaced position of the pin, the snapring 34 interengages the interior underside of the boss 28 by seating on the base portion of the hollow interior. Also in the locked displaced position, the pin 32 is locked with a padlock 36, the U-shaped shackle of which is received in the lower opening 38 of two vertically aligned padlock openings 38 and 40 each disposed tranversely in the upper outer portion of the pin. The padlock shackle interengages with the top outside of the boss 28 and prevents the pin from unwantedly advancing into the drive-establishing position which would interengage both caps 16 and 18 for conjoint rotation.

The upper shackle-receiving opening 40 is a storage opening by which the pin 32 carries the lock 36 when the lock is stored against loss while the cap assembly 10 is in drive-establishing relation.

In use of the cap assembly to accommodate filling the tank 14, the padlock 36 is changed from the lower lock opening 38 and relocked in the storage opening 40; the pin 32 falls into the first scallop 22 with which it registers upon slight manual rotation one way or the other of the outer cap 16. Counterclockwise rotation of the outer cap 16 by hand causes the filler cap 18 to rotate therewith and the assembly is unscrewed and removed as a unit from the neck 12. The tank 14 is filled, and the assembly 10 is then replaced by hand by a reverse process screwing it down. Thereafter, the padlock 36 is removed, the pin 32 is grasped at its outer end and lifted from the advanced drive-establishing position into the displaced position, and is locked in the latter position with the padlock 36 locked in the lower lock opening 38.

Figure 2:
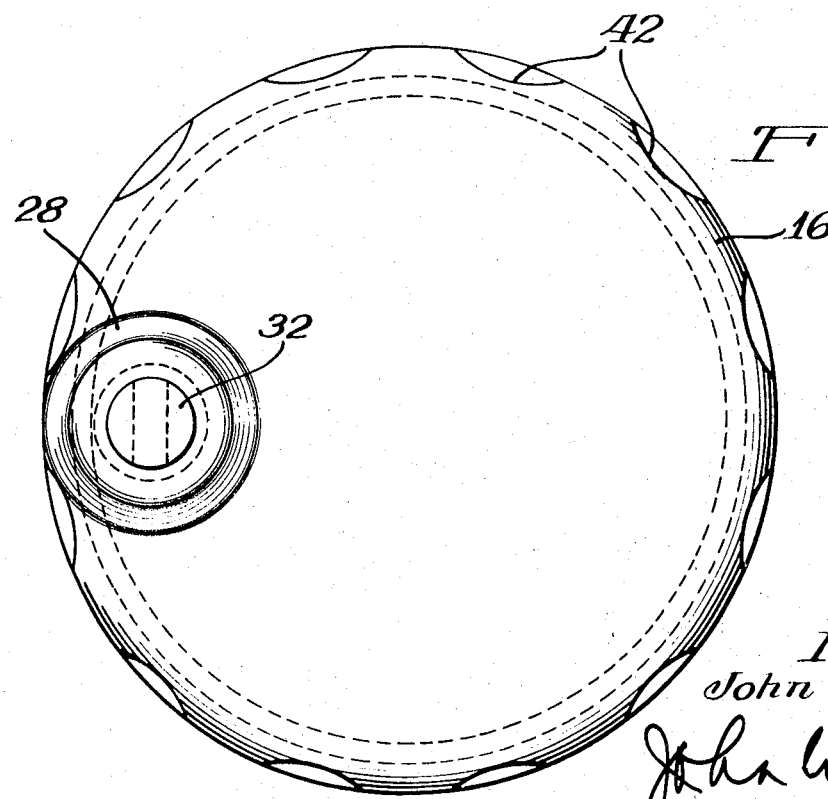

In plan view of FIG. 2 and the exploded view of FIG. 3, the outer cap 16 constituting the major one of the external parts is seen to have 12 finger scallops 42 arranged in 30° equal center-to-center spacing in a cylindrical ring thereabout.

The cap is assembled in a first stage by introducing the pin 32, with the snapring 34 installed, upwardly into the guide boss 28 so that the snapring 34 seats against the boss. In the last stage of assembly, the outer cap 16 (FIG. 3) is fitted over the filler cap, not shown, whereupon the snapring 26 is inserted and thereafter allowed to expand and lockingly seat in the inside snapring groove 27 in the mouth of the open end 24 of the cap 16.

Figure 5:
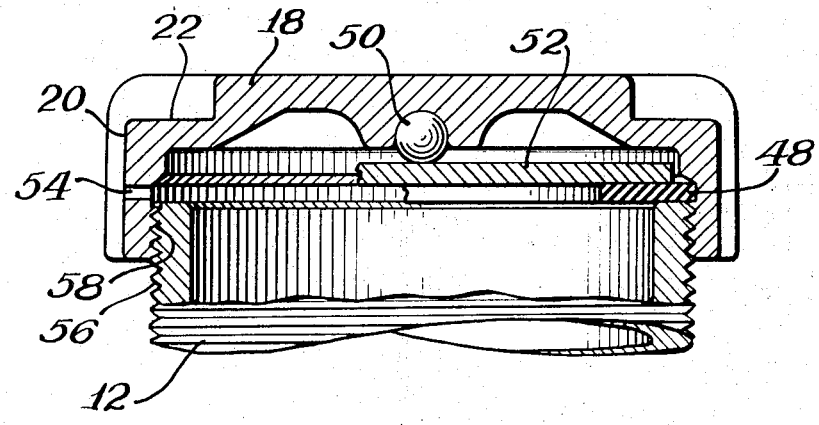

The filler cap 18, as shown in FIGS. 4 and 5, functions the same alone or in assembly. The scallops 22 and 20 of the respective upper and lower series for the fingers have the same 30° equal center to center spacing, have the same number 12, and are arranged so that each scallop in a series intersects or registers vertically with a scallop in the other series. The rings of scallops cooperatively afford a good finger grip by the operator when the cap 18 is used alone, whereas the upper ring of scallops 22 is the only series used when the cap 18 is in assembly.

A ring gasket 48 carried in the cap 18 forms a compression seal tranversely across the radially disposed end surface of the neck 12. Compression thereto from the cap is transmitted by an interengaged ball bearing 50 which is centrally staked in a blind opening in the underside of the cap 18 and a disc shaped imperforate plate 52 which, at the top center, engages the ball and which at the bottom outer periphery clamps down the gasket 48. The top of the filler cap 18 is intact all the way across, and the blind opening has a shallow depth confining it to the inner side of the top.

A radial vent opening 54 (FIG. 5) which is generally in the plane of the gasket 48 provides for timely venting of pressure from the tank, not shown, through the body of the cap 18 during the early part of and prior to completion of removal of the cap 1 from the neck 12.

The connection is made by pipe threads in the joint, the filler neck 12 carrying a set of external right-hand threads 56 and the mouth of the open end of the cap 18 carrying a mating set of internal threads 58. Other connections can equally well be used between the cap and neck, for instance, the well-known lug-type, quick-disconnect joint requiring no more than a 180° turning when a fast means of disconnection is preferable.

Figure 6:
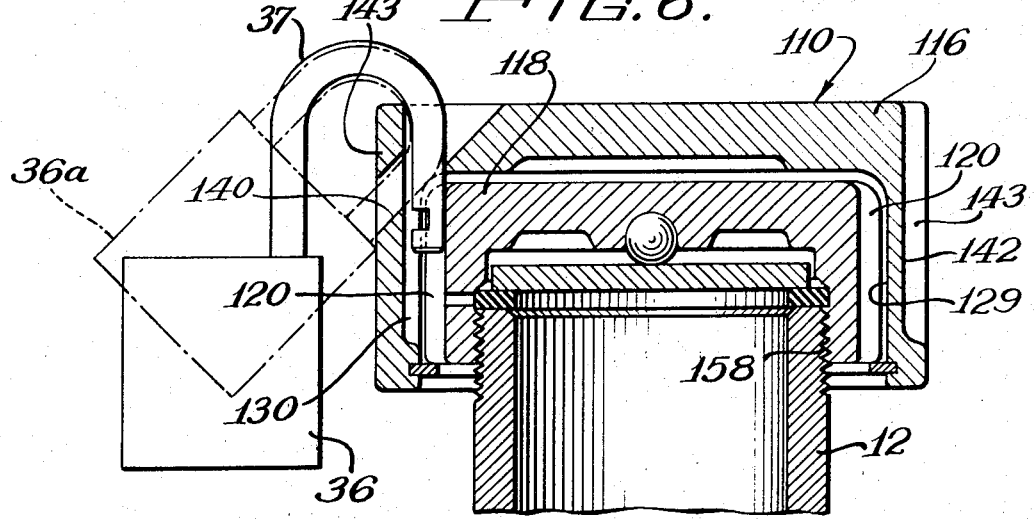
FIG. 6 is a longitudinal elevational sectional view of a modified assembly utilizing a dual function filler cap embodying my invention.

In the modification as shown in FIG. 6, a cap assembly 110 on the filler neck 12 can be secured by a padlock 36 but removal is prevented in another manner.

External finger scallops 142 in an outer cap 116 of the assembly are arranged in a common cylindrical ring with and in alternation to a series of fingers or radial protrusions 143. The outer cap 116 has a smooth cylindrical internal surface 129 intersected by a longitudinally extending, keyway forming a semicircular groove 130 depressed into the surface 129.

The groove 130 registers in radial alignment with a selected one of a series of keyway-forming semicircular scallops 120 arranged in a cylindrical ring externally about a filler cap 118 which is inside the outer cap 116. When the resulting circular, mutual keyway is unoccupied but blocked by a padlock in the storage, broken line position as shown by the broken lines 36a, there is no way to establish drive between the relatively rotatable outer and filler caps 116 and 188 in the assembly, which therefore cannot be unscrewed from the neck 12. In such storage position the shackle of the padlock is received in a diagonal slot 140 which is confined to the upper outer edge of the cap 116 and intersects the groove 130 to define a common vertical plane.

In order to remove the assembly 110 for fueling the vehicle, the padlock 36 is removed and a key is inserted in the longitudinal keyway such as the straight free end of the U-shaped padlock shackle 37 which is shown in solid lines and is available when the padlock 36 is unlocked. The keyed together caps of the assembly 110 are thereafter conjointly rotated by hand until the sets of threads 158 respectively disengage and the assembly is removed from the neck 12. After fueling, a reverse order of steps, an unkeying, and a relocking follow so that the screwed-on assembly cannot be removed.

The other parts of the assembly 110 are the same as in the preceding embodiment, and will not be identified by reference numeral or by description.

It will be noted that the circular keyway formed by the groove 130 and the selected complementary scallop or groove 120 extends radially into the outer cap 116 to provide maximum leverage on the shear-stressed key as it transmits, in opposite directions, the respective cap-applying torque and cap-removal torque to the filler cap 118. While a fourth part, namely, the separate pin 32 needed in the main embodiment of FIG. 1, is omitted from the modification of FIG. 6, the user will nevertheless encounter the disadvantage that the padlock 36 is not locked in place on the assembly when the assembly has the drive connected. Under those circumstances in FIG. 6, the padlock may eventually be lost because there is no pin to which to lock the padlock in order to prevent misplacing it.

The fact that the present assemblies are padlocked to prevent their unauthorized removal, means that nonfunctioning of the lock mechanism is remedied by the simple expedient of substituting a commercially available replacement padlock.

If the vehicle user loses his fuel tank cap, he has the choice to secure a replacement filler cap 18 or 118 either alone as a simple filler cap or in assembly as a disconnectible-type fuel tank protector.

Variations within the spirit and scope of the invention described are equally comprehended by the foregoing description.

What is claimed is:

1. For use with a threaded filler pipe adapted to be closed by a cap-carried plate and an interposed gasket, dual function cap protector therefor comprising:
   relatively rotatable filler and outer caps arranged one within the other and with respective outwardly facing and inwardly facing generally cylindrical surfaces confronting one another;
   a generally longitudinally extending groove in said inwardly facing surface of the outer cap registrable with a selected one of generally longitudinally extending finger grooves on the confronting outwardly facing surface of the filler cap to mutually define a longitudinal keyway; and
   key means insertable in the keyway so as to be at least partly in each of the grooves forming same and effective in shear as a key locking the caps for conjoint rotation.

2. The invention of claim 1, the caps characterized by detachable means of interengagement interposed at their common open ends which, when removed, enables the filler cap to be used as a nonlockable closure independently of the outer cap thereover, by physical separation of the outer cap therefrom.

3. The invention of claim 2, characterized by:
   the open end of the outer cap being prolongated slightly past the corresponding end of the filler cap;
   said means of interengagement comprising ring means detachably fixed within the prolongation and blocked by said corresponding end of the filler cap to prevent axial separation.

4. The invention of claim 1, characterized by:
   the outer cap having a lock storage slot formed therein at the outer end of its generally longitudinally extending groove aforesaid; and
   a padlock received in said slot in a locked, storage position of the padlock and having a shackle with a straight portion thereon insertable in the keyway to function as said key means for the keyway after the lock is unlocked.

* * * * *